US012657882B2

(12) United States Patent
Chong et al.

(10) Patent No.: US 12,657,882 B2
(45) Date of Patent: Jun. 16, 2026

(54) GAN IMAGE GENERATION FROM FEATURE REGULARIZATION

(71) Applicant: ADOBE INC., San Jose, CA (US)

(72) Inventors: Min Jin Chong, Seattle, CA (US); Krishna Kumar Singh, San Jose, CA (US); Yijun Li, Seattle, WA (US); Jingwan Lu, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 288 days.

(21) Appl. No.: 18/357,621

(22) Filed: Jul. 24, 2023

(65) Prior Publication Data

US 2025/0037431 A1      Jan. 30, 2025

(51) Int. Cl.
*G06V 10/774*        (2022.01)
*G06N 3/045*        (2023.01)
*G06N 3/0475*        (2023.01)

(52) U.S. Cl.
CPC ........... *G06V 10/774* (2022.01); *G06N 3/045* (2023.01); *G06N 3/0475* (2023.01)

(58) Field of Classification Search
CPC .... G06V 10/774; G06V 10/764; G06V 10/82; G06V 10/7747; G06N 3/045; G06N 3/0475; G06N 3/047; G06N 3/088; G06N 3/094; G06N 3/0464; G06N 3/09; G06N 3/08; G06N 3/084; G06N 3/0455; G06N 3/0895; G06N 3/048; G06N 3/0495; G06T 2207/20084; G06T 2207/20081; G06T 7/0012; G06T 11/00; G06F 18/2148; G06F 18/217; G06F 18/22; G06F 18/214; G06F 18/23
See application file for complete search history.

(56) References Cited

U.S. PATENT DOCUMENTS

| | | | | |
|---|---|---|---|---|
| 10,636,141 | B2 * | 4/2020 | Zhou | G06T 7/11 |
| 11,995,803 | B1 * | 5/2024 | Karpman | G06T 5/70 |
| 12,045,315 | B2 * | 7/2024 | Takeda | G06T 3/4046 |
| 2019/0122072 | A1 * | 4/2019 | Cricrì | G06N 3/045 |
| 2019/0295302 | A1 * | 9/2019 | Fu | G06N 3/0475 |
| 2020/0364477 | A1 * | 11/2020 | Rahman Siddiquee | |
| | | | | G06V 10/7753 |
| 2021/0089903 | A1 * | 3/2021 | Murray | G06F 18/2132 |
| 2021/0117773 | A1 * | 4/2021 | Sollami | G06F 18/214 |
| 2021/0224607 | A1 * | 7/2021 | Deng | G06N 3/0475 |
| 2021/0303927 | A1 * | 9/2021 | Li | G06F 18/2148 |

(Continued)

OTHER PUBLICATIONS

1Sauer, et al., "Projected GANs converge faster", arXiv preprint arXiv:2111.01007v1 [cs.CV] Nov. 1, 2021, 31 pages.

(Continued)

*Primary Examiner* — Michael S Osinski
(74) *Attorney, Agent, or Firm* — F. CHAU & ASSOCIATES, LLC

(57)        ABSTRACT

Systems and methods for training a Generative Adversarial Network (GAN) using feature regularization are described herein. Embodiments are configured to generate a candidate image using a generator network of a GAN, classify the candidate image as real or generated using a discriminator network of the GAN, and train the GAN to generate realistic images based on the classifying of the candidate image. The training process includes regularizing a gradient with respect to features extracted using a discriminator network of the GAN.

20 Claims, 10 Drawing Sheets

(56)                    References Cited

U.S. PATENT DOCUMENTS

| | | | |
|---|---|---|---|
| 2022/0076074 A1* | 3/2022 | Li | G06F 18/2155 |
| 2022/0148293 A1* | 5/2022 | Wang | G06V 10/7747 |
| 2022/0222532 A1* | 7/2022 | Shu | G06T 5/75 |
| 2022/0383906 A1* | 12/2022 | Mann | G06V 10/56 |
| 2023/0032472 A1* | 2/2023 | Wang | G06T 9/00 |
| 2023/0081171 A1* | 3/2023 | Zhang | G06T 11/00 |
| | | | 382/157 |
| 2023/0153606 A1* | 5/2023 | Min | G06N 3/08 |
| | | | 706/25 |
| 2023/0154165 A1* | 5/2023 | Park | G06V 10/82 |
| | | | 382/128 |
| 2023/0186098 A1* | 6/2023 | Chang | G06N 3/0464 |
| | | | 706/25 |
| 2023/0215162 A1* | 7/2023 | Kim | G06V 10/82 |
| | | | 382/157 |
| 2023/0377324 A1* | 11/2023 | Kim | G06V 10/82 |
| 2023/0394651 A1* | 12/2023 | Li | G06N 3/0475 |
| 2024/0169611 A1* | 5/2024 | Bendel | G16H 30/40 |
| 2024/0176045 A1* | 5/2024 | Ravuri | G08G 5/22 |
| 2024/0185473 A1* | 6/2024 | Pei | G06N 3/0455 |
| 2024/0346714 A1* | 10/2024 | Spinat | G06T 17/00 |
| 2025/0022137 A1* | 1/2025 | Rajapakse | G06T 7/0012 |
| 2025/0037430 A1* | 1/2025 | Wang | G06V 10/72 |
| 2025/0054108 A1* | 2/2025 | He | G06T 9/00 |
| 2025/0160728 A1* | 5/2025 | Khan | G16H 50/20 |
| 2025/0284191 A1* | 9/2025 | Van Kraaij | G03F 1/70 |

OTHER PUBLICATIONS

2Sauer, et al., "StyleGAN-XL: Scaling StyleGAN to Large Diverse Datasets", arXiv preprint arXiv:2202.00273v2 [cs.LG] May 5, 2022, 19 pages.
3Kumari, et al., "Ensembling Off-the-shelf Models for GAN Training", arXiv preprint arXiv:2112.09130v3 [cs.CV] May 4, 2022, 35 pages.
4Karras, et al., "A Style-Based Generator Architecture for Generative Adversarial Networks", arXiv preprint arXiv:1812.04948v3 [cs.NE] Mar. 29, 2019, 12 pages.
5Karras, et al., "Analyzing and Improving the Image Quality of StyleGAN", arXiv preprint arXiv:1912.04958v2 [cs.CV] Mar. 23, 2020, 21 pages.
6Heusel, et al., "GANs Trained by a Two Time-Scale Update Rule Converge to a Local Nash Equilibrium", arXiv preprint arXiv:1706.08500v6 [cs.LG] Jan. 12, 2018, 38 pages.
7Mescheder, et al., "Which Training Methods for GANs do actually Converge?", arXiv preprint arXiv:1801.04406v4 [cs.LG] Jul. 31, 2018, 39 pages.

* cited by examiner

Obtain a GAN — 805

Train the GAN to generate realistic images using feature regularization — 810

Obtain an input vector — 815

Generate an image based on the input vector using the GAN — 820

Provide a text input — 905

Encode the text input to generate a text embedding — 910

Generate an image, where the generation is conditioned by the text embedding — 915

Provide the image — 920

Figure 10:
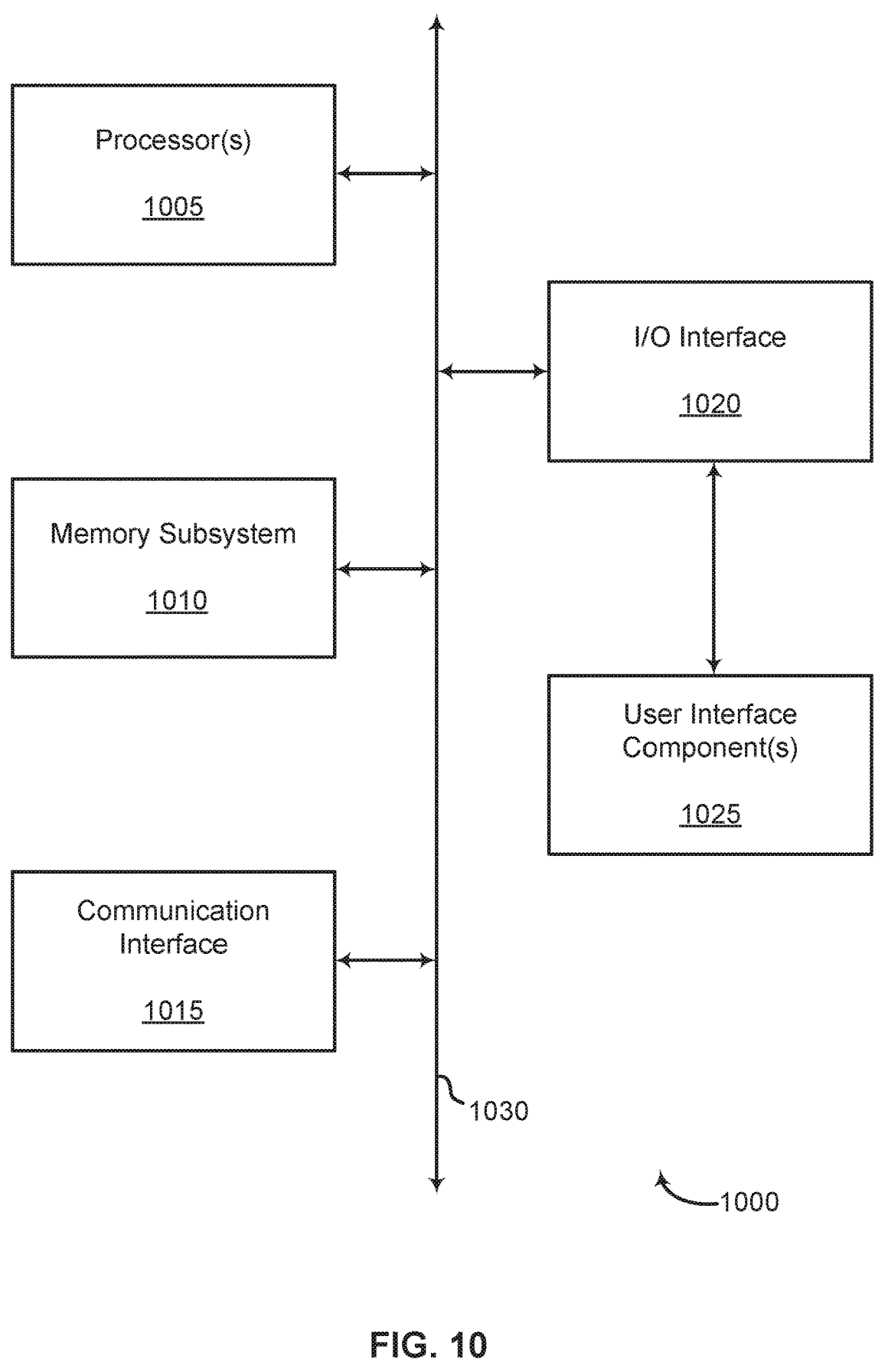

Processor(s)

1005

I/O Interface

1020

Memory Subsystem

1010

User Interface
Component(s)

1025

Communication
Interface

GAN IMAGE GENERATION FROM FEATURE REGULARIZATION

BACKGROUND

The following relates generally to generative machine learning models, and more specifically to image generation. Generative machine learning models are used to create data that is representative of data found in a training set. Models can generate data using an encoded prompt as conditional information, such as a text or an image. Recently, generative machine learning models have advanced significantly with the development of Generative Adversarial Networks (GANs). GANs include two neural networks, a generator and a discriminator, that compete against each other in a zero-sum game. The generator creates synthetic images, while the discriminator distinguishes between real and generated images. Through this adversarial process, both networks iteratively improve during a training process, resulting in the generator producing increasingly realistic images. GANs have found applications across various domains, including art, design, and entertainment, and have facilitated progress in the synthesis of high-quality, realistic images.

SUMMARY

Embodiments of the present disclosure include an image generation apparatus including a GAN which is trained based on feature regularization. During training, a generator network of the GAN learns to produce images while a discriminator network learns to classify them as real or synthetic. Conventional discriminator networks learn using a pixel-based loss from their classification of the generated images. In contrast, a discriminator network of the present disclosure learns from a feature regularization loss computed with respect to features in embeddings. This type of training enables the discriminator network to converge faster and allows the discriminator network to be applied to varying generator network architectures.

A method, apparatus, non-transitory computer readable medium, and system for image generation are described. One or more aspects of the method, apparatus, non-transitory computer readable medium, and system include generating a candidate image using a generator network of a GAN; classifying the candidate image as real or generated using a discriminator network of the GAN; and training the GAN to generate realistic images based on the classifying of the candidate image, wherein the training includes regularizing a gradient with respect to features generated by the GAN.

A method, apparatus, non-transitory computer readable medium, and system for image generation are described. One or more aspects of the method, apparatus, non-transitory computer readable medium, and system include obtaining an input vector and generating an image based on the input vector using a generative adversarial network (GAN), wherein the GAN is trained by regularizing a gradient with respect to features generated by the GAN.

An apparatus, system, and method for image generation are described. One or more aspects of the apparatus, system, and method include at least one processor; at least one memory including instructions executable by the processor; and a GAN comprising parameters stored in the at least one memory, wherein the GAN is trained to generate images by regularizing a gradient with respect to features generated by the GAN.

BRIEF DESCRIPTION OF THE DRAWINGS

FIG. 10 shows an example of a computing device according to aspects of the present disclosure.

DETAILED DESCRIPTION

Figure 1:
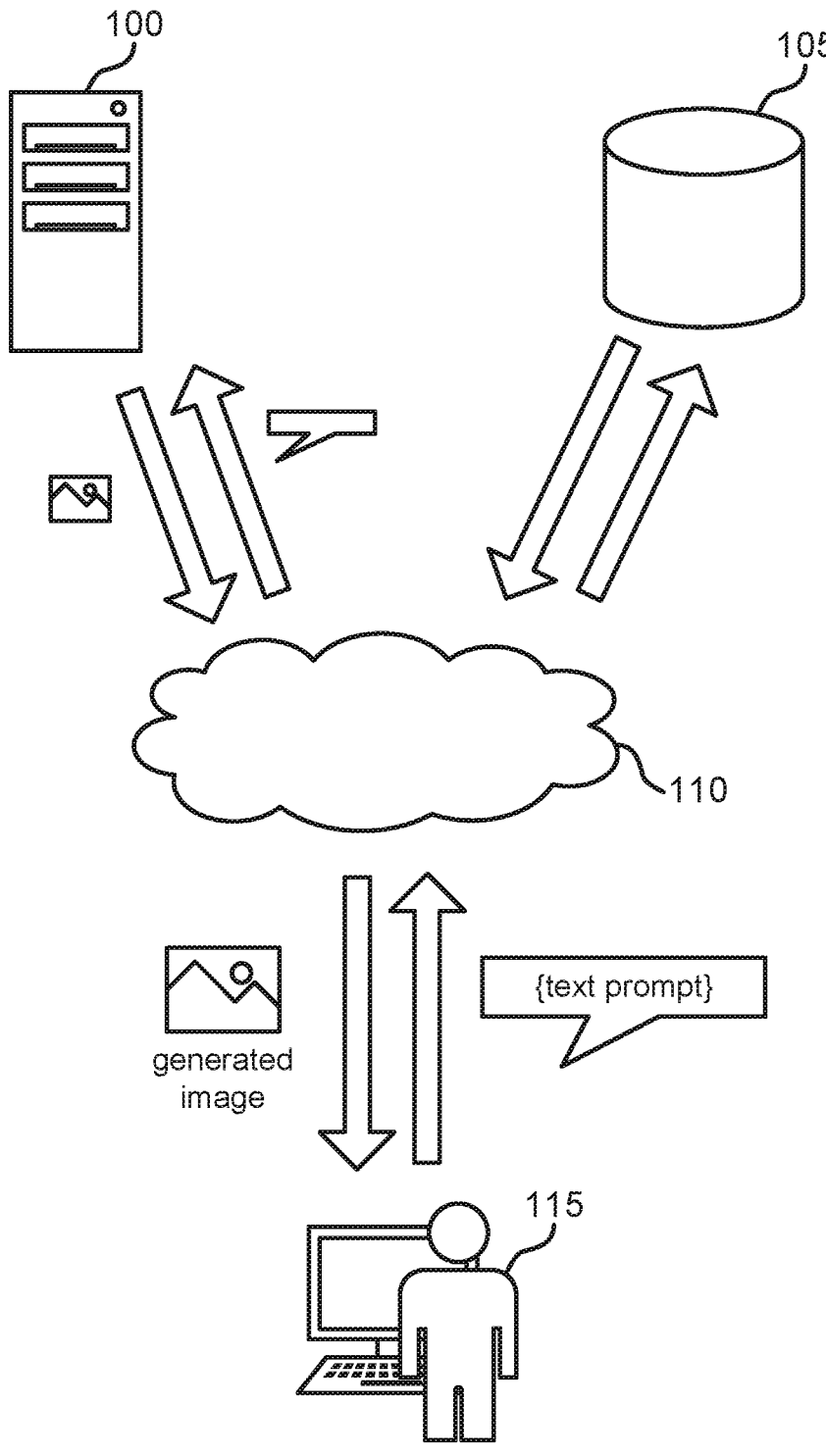
FIG. 1 shows an example of an image generation system according to aspects of the present disclosure.

Generative models such as GANs are used to create new images or alter existing images. As described above, the training process for a GAN involves training both a generator network and a discriminator network at the same time. Conventional training techniques are based on training both networks from scratch; e.g., both the generator network and the discriminator network are initialized with random values before the training process begins. This approach will yield a trained generator network, but can use significant time and compute costs.

Accordingly, researchers have developed various methods to reduce training time for GANs. One method is to incorporate pre-trained features into the GAN before starting the generator-discriminator training. In this way, the discriminator network begins with the ability to encode features from the samples output by the generator network, without having to learn how to encode from scratch. This method can increase training speed, but in many cases, the training does not converge because the discriminator dominates the two-player training phase, and the generator cannot effectively learn. Furthermore, simply using pre-trained features results in the discriminator overfitting the training data.

Some methods try to handle the overfitting with various regularization measures in the training process. For example, some methods include using multiple discriminators throughout the training process, where the first discriminator is less knowledgeable, and the final discriminator acts as a sort of fine-tuning classifier. Other methods have applied post-processing to the samples from the generator, such as by adding noise to reduce the pre-trained discriminators efficacy and allow the generator time to learn.

The aforementioned regularization measures address the overfitting and allow the generator time to learn. However, they disrupt the adversarial training process, leading to poor results such as visual artifacts, distortions, and other inaccuracies. The training process may reach convergence more quickly with these measures, but the final trained generator does not produce desirable outputs.

Embodiments of the present disclosure are configured to perform a different type of regularization referred to herein as 'feature regularization'. Instead of computing losses with respect to image pixels, embodiments compute a loss with respect to the features extracted from a pretrained encoder in the discriminator. This type of regularization leads to faster, stabler convergence in the training process of the GAN. In this way, embodiments improve on image generation by providing a discriminator network that enables fast training of GANs and a large reduction in training resources. This increases the accessibility for researchers, creators, and others to train generative models over specific datasets.

An image generation system is described with reference to FIGS. 1-4. A training process for the system including feature regularization is described with reference to FIGS. 5-7. Examples of using the system to generate images are described with reference to FIGS. 8-9. A computing device configured to implement an image generation apparatus is described with reference to FIG. 10.

Image Generation System

An apparatus for image generation is described. One or more aspects of the apparatus include at least one processor; at least one memory including instructions executable by the processor; and a GAN comprising parameters stored in the at least one memory, wherein the GAN is trained to generate images by regularizing a gradient with respect to features generated by the GAN.

In some aspects, the GAN comprises a generator network configured to generate the images. In some aspects, the GAN comprises a discriminator network configured to classify the images, wherein the training is based on the classifying of the images.

Some examples of the apparatus, system, and method further include a training component configured to compute a regularization loss, wherein the training is based on the regularization loss. In some aspects, the regularization loss comprises an R1 regularization loss.

In some aspects, the discriminator network of the GAN comprises a pretrained encoder. In some aspects, the discriminator network of the GAN comprises a plurality of classifiers. In some aspects, the discriminator network of the GAN comprises a plurality of encoders corresponding to the plurality of classifiers, respectively.

FIG. 1 shows an example of an image generation system according to aspects of the present disclosure. The example shown includes image generation apparatus 100, database 105, network 110, and user 115. Image generation apparatus 100 is an example of, or includes aspects of, the corresponding element described with reference to FIG. 2.

In an example, the user 115 inputs a text prompt into the system via a user interface. The text prompt may describe an object or scene the user wishes to generate. The network 110 facilitates the delivery of the prompt to image generation apparatus 100, which may then encode the text prompt into an embedding. Image generation apparatus 100 then generates an image using the prompt embedding as conditional information, and sends the generated image back to user 115.

In some embodiments, the user provides an image as a prompt instead. In at least some embodiments, image generation apparatus 100 generates images unconditionally, i.e., without a prompt as a basis.

Image generation apparatus 100, or one or more components thereof, can be implemented on a server. A server provides one or more functions to users 115 linked by way of one or more of the various networks 110. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Database 105 is configured to store data or information used by the system for the image generation process. For example, database 105 may hold parameters of one or more various machine learning models used by image generation apparatus 100, as well as training data. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, user 115 interacts with the database controller. In other cases, database controller may operate automatically without user interaction.

Network 110 is configured to facilitate the transfer of information between image generation apparatus 100, database 105, and user 115. In some cases, network 110 is referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

Figure 2:
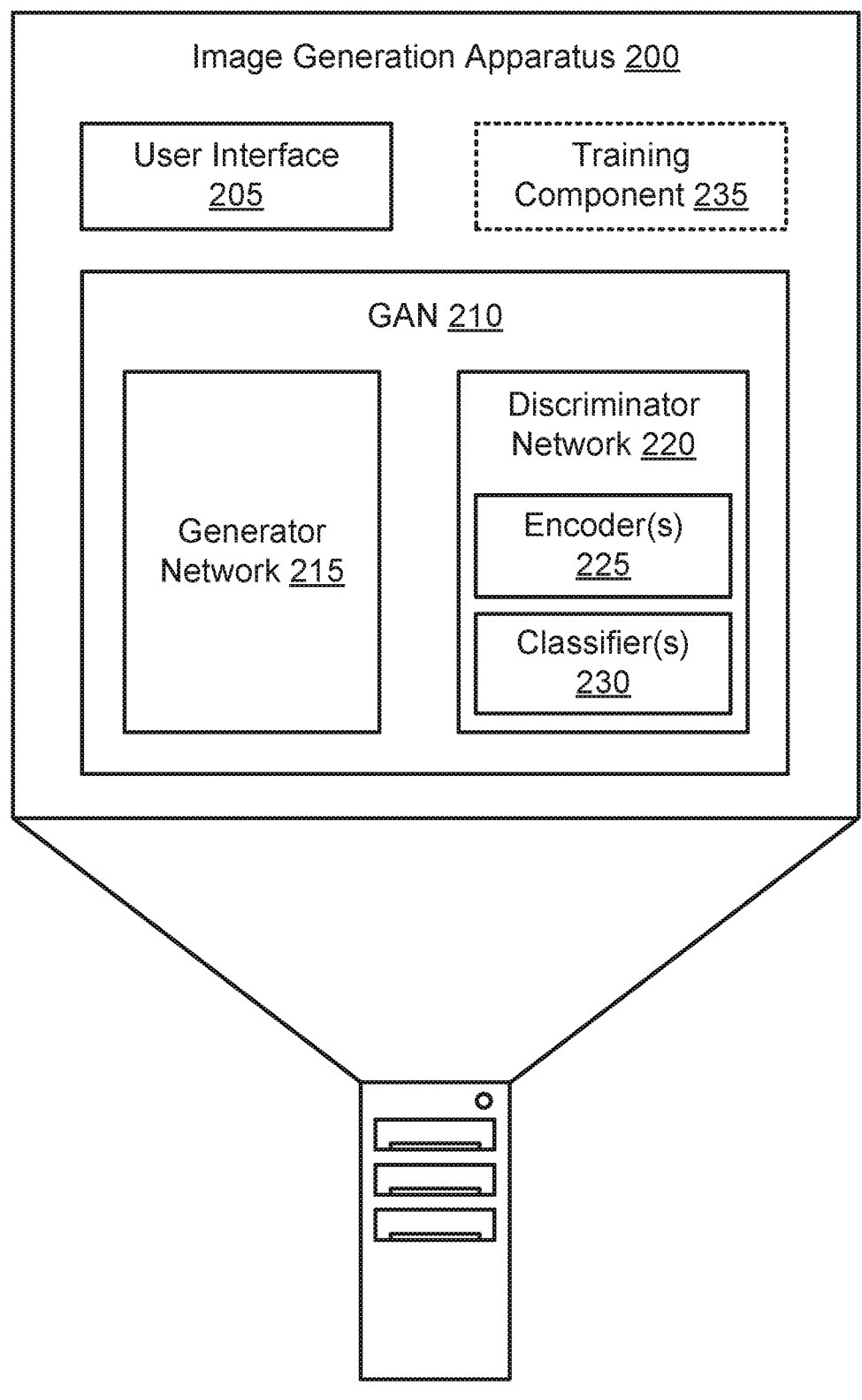
FIG. 2 shows an example of an image generation apparatus according to aspects of the present disclosure.

FIG. 2 shows an example of an image generation apparatus 200 according to aspects of the present disclosure. The example shown includes image generation apparatus 200, user interface 205, GAN 210, and training component 235. In one aspect, GAN 210 includes generator network 215 and discriminator network 220.

A user interface enables interactions between a user and a device. In some embodiments, user interface 205 may include an audio device, such as an external speaker system, an external display device such as a display screen, or an input device (e.g., remote control device interfaced with the user interface directly or through an IO controller module). In some cases, user interface 205 includes a graphical user interface (GUI). For example, in some embodiments, the user provides a text prompt through a website including the GUI.

A GAN 210 is an artificial neural network (ANN) in which two neural networks (e.g., a generator and a discriminator) are trained based on a contest with each other. For example, the generator learns to generate a candidate data by mapping information from a latent space to a data distribution of interest, while the discriminator distinguishes the candidate produced by the generator from a true data distribution of the data distribution of interest. The generator's training objective is to increase an error rate of the discriminator by producing novel candidates that the discriminator classifies as "real" (e.g., belonging to the true data distribution).

Therefore, given a training set, the GAN learns to generate new data with similar properties as the training set. For example, a GAN trained on photographs can generate new images that look authentic to a human observer. GANs may be used in conjunction with supervised learning, semi-supervised learning, unsupervised learning, and reinforcement learning.

One or more components of GAN 210 include a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

For example, encoder(s) 225 of discriminator network 220 may include one or more CNNs. Encoder(s) 225 include one or more pre-trained networks that are configured to extract features from an input image. In some embodiments, the input image is an output image of generator network 215. Encoder(s) 225 may include one or more learned filters within CNN layers, or one or more attention heads in transformer layers, that are configured to extract features from an image. 'Features' refer to a vector, or a list of numbers, that encode information about an image that is usable by the neural network in a downstream task such as classification. For example, the features extracted by encoder(s) 225 may be used by classifier(s) 230 to make a determination as to whether the input image was real or synthetic.

Some embodiments of encoder(s) 225 are based on one or more foundational models that are configured to extract features for different purposes. In at least one example, encoder(s) 225 includes a feature extractor that is based on a CNN, and another feature extractor that is based on a vision transformer (ViT). A vision transformer (e.g., a ViT model) is a neural network model configured for computer vision tasks. Unlike CNNs, ViTs use a transformer architecture, which was originally developed for natural language processing (NLP) tasks. ViTs break down an input image into a sequence of patches, which are then fed through a series of transformer encoder layers. The output of the final encoder layer is fed into a multi-layer perceptron (MLP) head for classification. ViT can capture long-range dependencies between patches without relying on spatial relationships. In some embodiments, the ViT feature extractor is adapted from CLIP.

Contrastive Language-Image Pre-Training (CLIP) is a neural network that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations.

Generator network 215 is configured to generate image data from an input vector. In some embodiments, the input vector is a random vector that is sampled from a distribution such as a normal distribution. In some examples, the input vector is conditioned with prompt information. Additional detail regarding a generator network, including mapping network and synthesis network subcomponents, will be described with reference to FIG. 3.

According to some aspects, discriminator network 220 classifies a candidate image as real or generated. In some examples, discriminator network 220 computes features using an encoder, such as encoder(s) 225. In some aspects, the encoder includes a pretrained encoder. In some embodiments, the pretrained encoder is a ViT-based encoder such as CLIP. In some embodiments, the pretrained encoder is a CNN-based encoder such as Efficient-Net. In some aspects, the candidate image includes a face image, and the discriminator network 220 of the GAN 210 is trained to classify face images as real or synthetic.

In some aspects, the discriminator network 220 of the GAN 210 includes a set of classifiers. In some aspects, the discriminator network 220 of the GAN 210 includes a set of encoders corresponding to the set of classifiers, respectively. Discriminator network 220 is an example of, or includes aspects of, the corresponding element described with reference to FIG. 7.

Training component 235 is configured to compute a loss function for GAN 210 during a training phase, and to adjust parameters of GAN 210 based on the loss function. According to some aspects, training component 235 trains the GAN 210 to generate realistic images based on the classifying of the candidate image, where the training includes regularizing a gradient with respect to features generated by the GAN 210. In some examples, training component 235 computes a regularization loss based on the features. In some aspects, the regularizing includes R1 regularization. In some examples, training component 235 computes a discriminator loss based on the classifying of the candidate image, where the GAN 210 is trained using the discriminator loss.

According to some aspects, training component 235 is configured to compute a regularization loss, wherein the training is based on the regularization loss. In some aspects, the regularization loss includes an R1 regularization loss. Some embodiments of the regularization loss include a relativistic loss. Additional details regarding the computation of the loss will be described with reference to FIGS. 5-7.

Training component 235 is an example of, or includes aspects of, the corresponding element described with reference to FIG. 5. In at least one embodiment, training component 235 is provided by an apparatus different from image generation apparatus 200.

Figure 3:
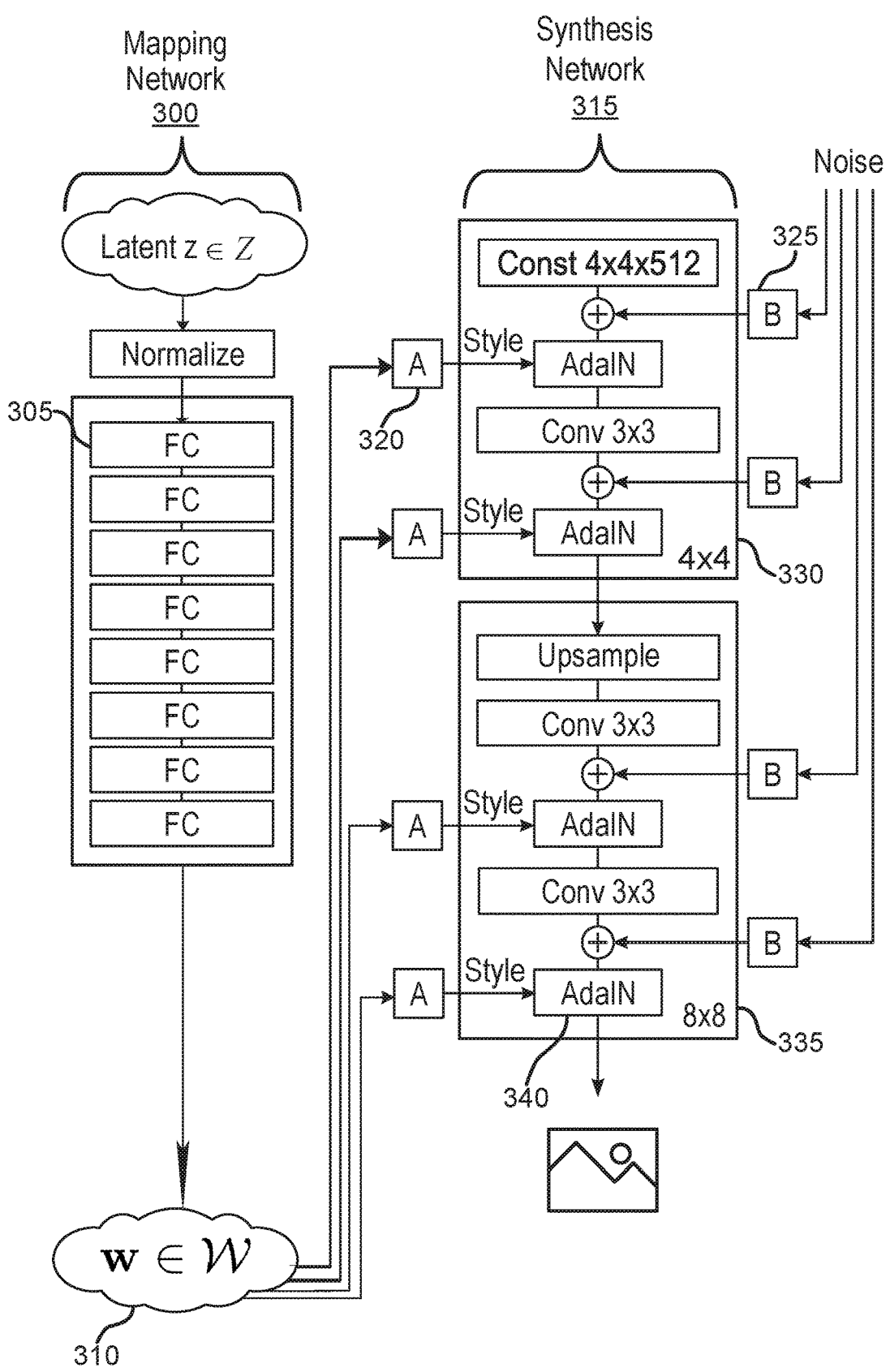
FIG. 3 shows an example of a generator network according to aspects of the present disclosure.

FIG. 3 shows an example of a generator network according to aspects of the present disclosure. The example shown includes mapping network 300, fully connected layer 305, intermediate latent space 310, synthesis network 315, learned affine transform 320, learned per-layer scaling factors 325, first convolutional layer 330, second convolutional layer 335, and adaptive instance normalization 340.

In an example GAN, a generator network generates candidate data, such as images, while a discriminator network evaluates them. The generator network learns to map from a latent space to a data distribution of interest, while the discriminator network distinguishes candidates produced by the generator from the true data distribution. The generator network's training objective is to increase the error rate of the discriminator network, i.e., to produce novel candidates that the discriminator network classifies as real.

Embodiments herein include a generator network with two sub-components, a mapping network and a synthesis network. In an example process, mapping network 300 performs a reduced encoding of the original input and the synthesis network 315 generates, from the reduced encoding, a representation as close as possible to the original input. According to some embodiments, the mapping network 300 includes a deep learning neural network comprised of fully connected layers (e.g., fully connected layer FC 305). In some cases, the mapping network 300 takes a randomly sampled point from the latent space, such as intermediate latent space 310, as input and generates a latent vector as output. In some cases, the latent vector encodes style attributes.

According to some embodiments, the synthesis network 315 includes a first convolutional layer 330 and a second convolutional layer 335. For example, the first convolutional layer 330 includes convolutional layers, such as a conv 3×3, adaptive instance normalization (AdaIN) layers, or a constant, such as a 4×4×512 constant value. For example, the second convolutional layer 335 includes an upsampling layer (e.g., upsample), convolutional layers (e.g., conv 3×3), and adaptive instance normalization (AdaIN) layers.

The synthesis network 315 takes a constant value, for example, a constant 4×4×512 constant value, as input to start the image synthesis process. The latent vector generated from the mapping network 300 is transformed by learned affine transform 320 and is incorporated into each block of the synthesis network 315 after the convolutional layers (e.g., conv 3×3) via the AdaIN operation, such as adaptive instance normalization 340. In some cases, the adaptive instance normalization layers can perform the adaptive instance normalization 340. The AdaIN layers first standardize the output of feature map so that the latent space maps to features in a way such that a randomly selected feature map will result in features that are distributed with a Gaussian distribution, then add the latent vector as a bias term. This allows choosing a random latent variable so that the resulting output will not bunch up. In some cases, the output of each convolutional layer (e.g., conv 3×3) in the synthesis network 315 is a block of activation maps. In some cases, the upsampling layer doubles the dimensions of input (e.g., from 4×4 to 8×8) and is followed by another convolutional layer(s) (e.g., third convolutional layer).

According to some embodiments, Gaussian noise is added to each of these activation maps prior to the adaptive instance normalization 340. A different noise sample is generated for each block and is interpreted using learned per-layer scaling factors 325. In some embodiments, the Gaussian noise introduces style-level variation at a given level of detail.

During training, the final output data is sent to a discriminator network for evaluation. Once training has completed, the discriminator network is removed, and the final output is provided (e.g., to a user) as the generated image.

Figure 4:
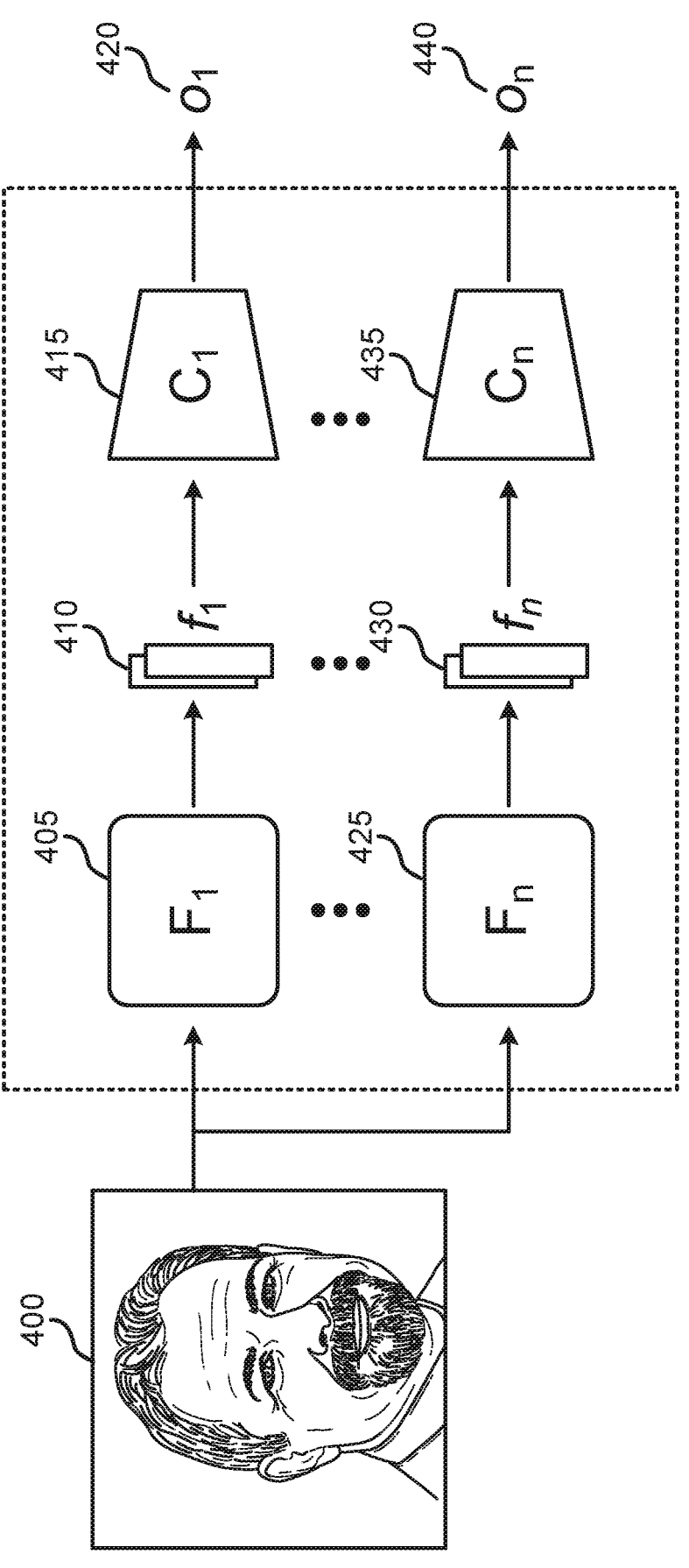
FIG. 4 shows an example of a discriminator network according to aspects of the present disclosure.

FIG. 4 shows an example of a discriminator network according to aspects of the present disclosure. The example shown includes input image 400, first encoder 405, first feature set 410, first classifier 415, first classification 420, nth encoder 425, nth feature set 430, nth classifier 435, and nth classification 440. The elements shown in FIG. 4 are examples of, or include aspects of, the corresponding elements described with reference to FIG. 5.

FIG. 4 illustrates an example discriminator network which includes a plurality of "feature stacks". A feature stack refers to the combination of a pretrained encoder and the features extracted by the pretrained encoder from input data. Embodiments of the discriminator are not necessarily limited to multiple feature stacks, and embodiments that include only one encoder, set of features, and classifier may be used.

The discriminator network is used during a training process of the GAN. In an example, the generator network produces output data (as described with reference to FIG. 3), which is then provided to the discriminator network as input image 400. First encoder 405 is configured to extract information from the image, i.e., "features", to produce first feature set 410. First feature set 410 is input to first classifier 415, which computes first classification 420 based on the features. First classification 420 indicates a determination of whether input image 400 is real, i.e., labeled as real from a set of real training images or synthetic, i.e., produced by the generator network. For example, first classification 420 may include a scalar value that indicates the probability of the image as synthetic, or, in some embodiments, as real. The prediction in first classification 420 is made with respect to first feature set 410.

This process is repeated for the other feature stacks. For example, nth encoder 425 may produce nth feature set 430 from input image 400, which is applied to nth classifier 435 to determine nth classification 440. In some embodiments, a final classification of input image 400 as real or synthetic is determined based on a representative statistic of n-classification scores, such as an average of the scores. In some examples, parameters of the GAN are updated based on this final classification during the training process. Additional detail regarding this process will be provided with reference to FIG. 5.

Training with Feature Regularization

A method for image generation is described. One or more aspects of the method include generating a candidate image using a generator network of a generative adversarial network (GAN); classifying the candidate image as real or generated using a discriminator network of the GAN; and training the GAN to generate realistic images based on the classifying of the candidate image, wherein the training includes regularizing a gradient with respect to features generated by the GAN.

Some examples of the method, apparatus, non-transitory computer readable medium, and system further include computing the features using an encoder of the discriminator network of the GAN. In some aspects, the encoder comprises a pretrained encoder.

Some examples of the method, apparatus, non-transitory computer readable medium, and system further include computing a regularization loss based on the features. In some aspects, the regularizing comprises R1 regularization.

Some examples of the method, apparatus, non-transitory computer readable medium, and system further include obtaining training data including a ground-truth image. Some examples further include classifying the ground-truth image as real using the discriminator network of the GAN, wherein the GAN is trained based on the classifying of the ground-truth image. Some examples further include computing a discriminator loss based on the classifying of the candidate image or the ground-truth image, wherein the GAN is trained using the discriminator loss.

Some examples of the method, apparatus, non-transitory computer readable medium, and system further include training an additional GAN having a different architecture from the GAN using the discriminator network of the GAN. In some examples, the encoder(s) of discriminator network are held fixed, while the classifier(s) of the discriminator network are tuned for different GANs or different training sets corresponding to different domains.

Embodiments of the present disclosure are configured to perform regularization on a set of learned classifiers that have been appended to frozen, pretrained feature stacks. In some cases, the pretrained feature stacks are obtained from foundation models, such as CLIP or EfficientNet. The feature space produced by the foundational models is deep and informative. However, in some cases, this might cause the classifier(s) to focus on only a few features early in training and ignore the rest, leading to poor gradient signals and inhibiting learning based on other features. Accordingly, embodiments implement a form of regularization that encourages the discriminator to use the features evenly.

R1 regularization is used as a form of gradient penalty that penalizes the discriminator for deviating from Nash equilibrium. Given x as the input, D as the discriminator, and $\gamma$ as the weighting term, the R1 regularizer is of the form $$\mathcal{L}_{R1} = \frac{\gamma}{2}\mathbb{E}_{x \sim p_D}\left[\|\nabla_x D(x)\|_2^2\right] \tag{1}$$

and encourages the gradient with respect to each input to be approximately zero. This regularization prevents the model from overfitting to any one or few particular inputs.

Embodiments include multiple encoders, which are sometimes referred to as feature extractors. A trainable classifier (i.e., $C_{1, \ldots, k}$) is placed on each feature extractor. In a sense, the discriminator network can be considered as containing multiple sub-discriminators $D_i$ that each include a feature extractor $F_i$ and a trainable classifier $C_i$. Thus, given an image x, the output logits for discriminator $D_i$ is $$o_i = D_i(x) = C_i(F_i(x)) \tag{2}$$

In some embodiments, during training, $F_i$ is fixed while $C_i$ is updated. Thus, any instabilities in the discriminator network will be constrained to $C_i$. To prevent instability, embodiments apply an R1 regularization to $C_i$ with respect to its input features. Hence:

$$\mathcal{L}_{FR1} = \frac{\gamma}{2}\mathbb{E}\left[\|\nabla_{f_i} C_i(f_i)\|_2^2\right] \tag{3}$$

In this way, an R1 regularization referred to herein as "feature regularization" is performed, which computes a loss with respect to the features extracted from foundation models ($F_i(x)$) (i.e., instead of image pixels (x)). Furthermore, computing gradients over $C_i$ (e.g., instead of $D_i$) does not involve computing gradients through multiple layers of large foundation models and is therefore computationally less expensive.

Some embodiments are further configured to compute weights for each feature stack. In some cases, these weights are computed according to rules or heuristics, such that they do not need to be manually determined for different GAN architectures.

An embodiment of the present disclosure includes automatic tuning of $\gamma_i$. In some cases, features with large L2 norms use a larger gradient penalty (large $\gamma$). Accordingly, $\gamma_i$ is scaled by the feature's average L2 norm across the batch. Thus, some embodiments compute weight $\gamma_i$ by:

$$\gamma_i = \frac{\lambda}{N}\sum_{j=1}^{N}\|f_{ij}\|_2 \tag{4}$$

where $f_{ij}$ represents the jth feature in the batch of features extracted by $F_i$ and $\lambda$ is a constant weighting term that is used for the constituent discriminators of the discriminator network. In some cases, a single $\lambda$ is tuned for the discriminators, e.g., instead of adjusting $\gamma_i$ for each feature extractor. In some cases, the same $\lambda$ can be used across different datasets and generators such that discriminator network does not use any form of hyperparameter tuning.

Conventional GANs use various versions of the loss function. For example, StyleGAN uses the non-saturating loss and ProjectedGAN uses the hinge loss. An embodiment of the present disclosure includes use of relativistic loss and the non-saturating loss. In some cases, the combined use of the relativistic and the non-saturating losses results in increased stability and a visual improvement in results.

Relativistic loss changes the discriminator's output to generate the probability of real data, and enables the discriminator to compute a probability of real data being more realistic than sampled fake data (e.g., from the generator). The relativistic loss is computed by:

$$\hat{D}(x) = \begin{cases} D(x) - \mathbb{E}_{x_f}D(x_f) & \text{if } x \text{ is real} \\ D(x) - \mathbb{E}_{x_r}D(x_r) & \text{if } x \text{ is fake} \end{cases} \tag{5}$$

Some embodiments include multiple discriminator outputs and feature extractors. In such embodiments, the losses may be averaged to compute the final loss.

Figure 5:
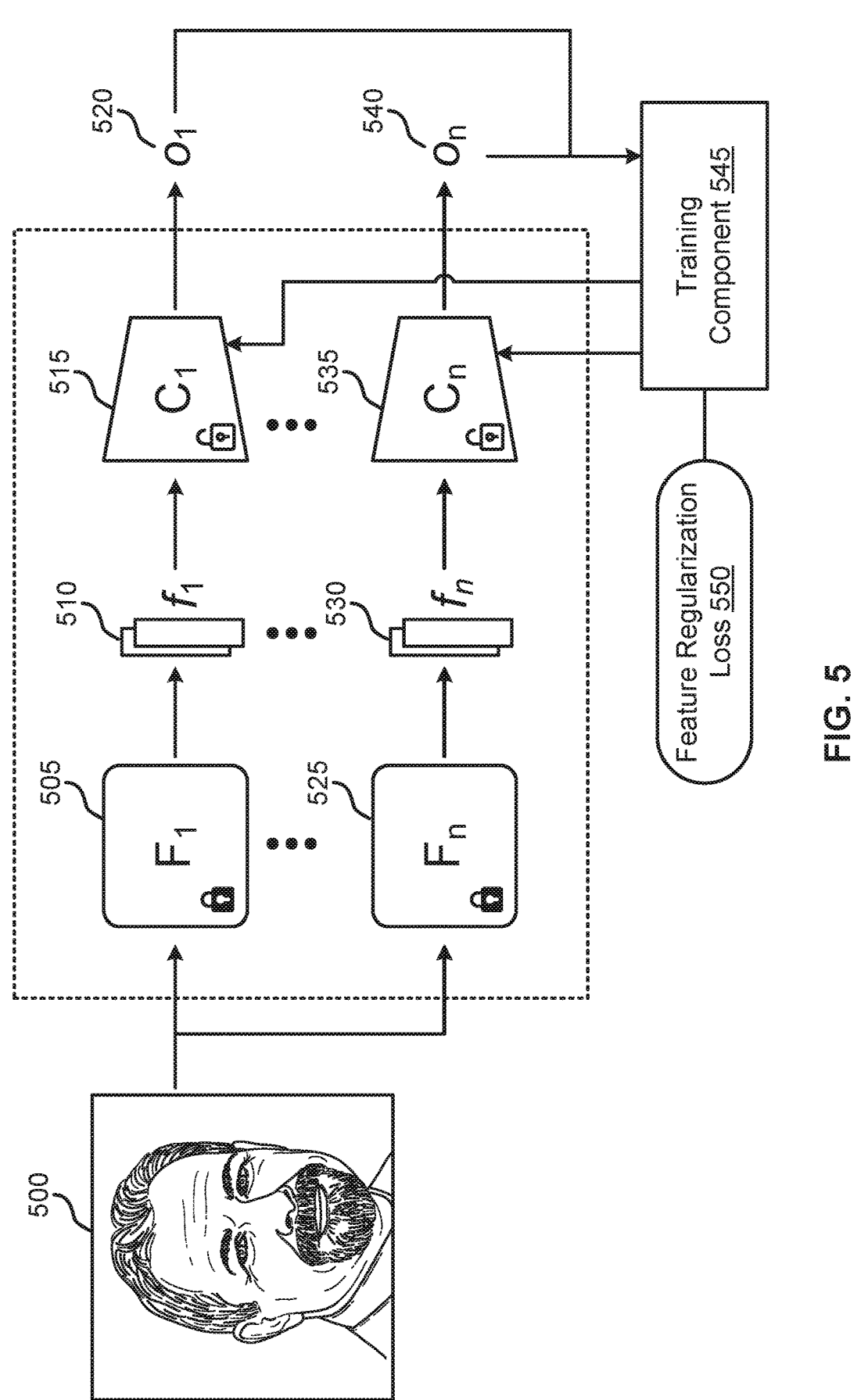
FIG. 5 shows an example of a discriminator network during training according to aspects of the present disclosure.

FIG. 5 shows an example of a discriminator network during training according to aspects of the present disclosure. The example shown includes input image 500, first encoder 505, first feature set 510, first classifier 515, first classification 520, nth encoder 525, nth feature set 530, nth classifier 535, nth classification 540, training component 545, and feature regularization loss 550.

Input image 500, first encoder 505, first feature set 510, first classifier 515, first classification 520, nth encoder 525, nth feature set 530, nth classifier 535, and nth classification 540 are examples of, or include aspects of, the corresponding elements described with reference to FIG. 4. Training component 545 is an example of, or includes aspects of, the corresponding element described with reference to FIG. 2.

As indicated by the lock icons, first encoder 505 through nth encoder 525 may be held fixed during the training process, while parameters of first classifier 515 through nth classifier 535 are updated. According to some aspects, training component 545 computes a relativistic loss based on feature regularization, i.e., feature regularization loss 550, according to Equations (3) and (5). Then, training component 545 adjusts the parameters of first classifier 515 through nth classifier 535 based on feature regularization loss 550. This method of using feature regularization loss 550 to update the classifiers enables a GAN including the discriminator network described herein to be trained with increased speed and stability.

Figure 6:
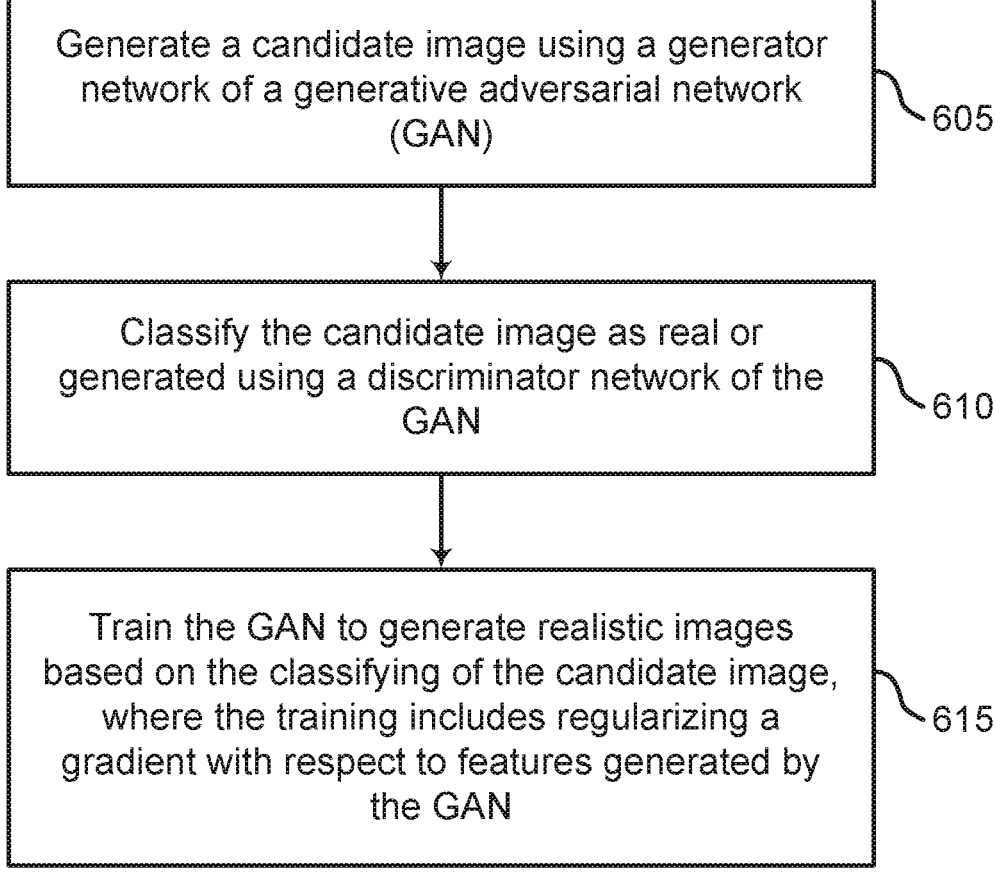
FIG. 6 shows an example of a method for training a GAN with feature regularization according to aspects of the present disclosure.

FIG. 6 shows an example of a method for training a GAN with feature regularization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system generates a candidate image using a generator network of a generative adversarial network (GAN). In some cases, the operations of this step refer to, or may be performed by, a generator network as described with reference to FIGS. 2 and 3. The GAN may generate the candidate image using a random or noise vector as a basis.

At operation 610, the system classifies the candidate image as real or generated using a discriminator network of the GAN. In some cases, the operations of this step refer to, or may be performed by, a discriminator network as described with reference to FIGS. 2, 4-5, and 7. For example, the discriminator network may include one or more pretrained feature stacks, with classifiers appended to each of the one or more pretrained feature stacks. The classifier(s) may then compute a score that indicates whether the image is real or fake.

At operation 615, the system trains the GAN to generate realistic images based on the classifying of the candidate image, where the training includes regularizing a gradient with respect to features generated by the GAN. In some cases, the operations of this step refer to, or may be performed by, a training component as described with reference to FIGS. 2 and 5. In some cases, the system trains the appended classifiers of the discriminator network, while holding parameters of the pretrained encoders fixed.

In at least one embodiment, the GAN includes a generator network that is at least partially pretrained. For example, the generator network may include a mapping network and a synthesis network as described with reference to FIG. 3. The mapping network may include a series of multilayer perceptrons (MLPs) that form a connected neural network. In some examples, the GAN includes a pretrained synthesis network, while the parameters of the mapping network are randomly initialized.

Figure 7:
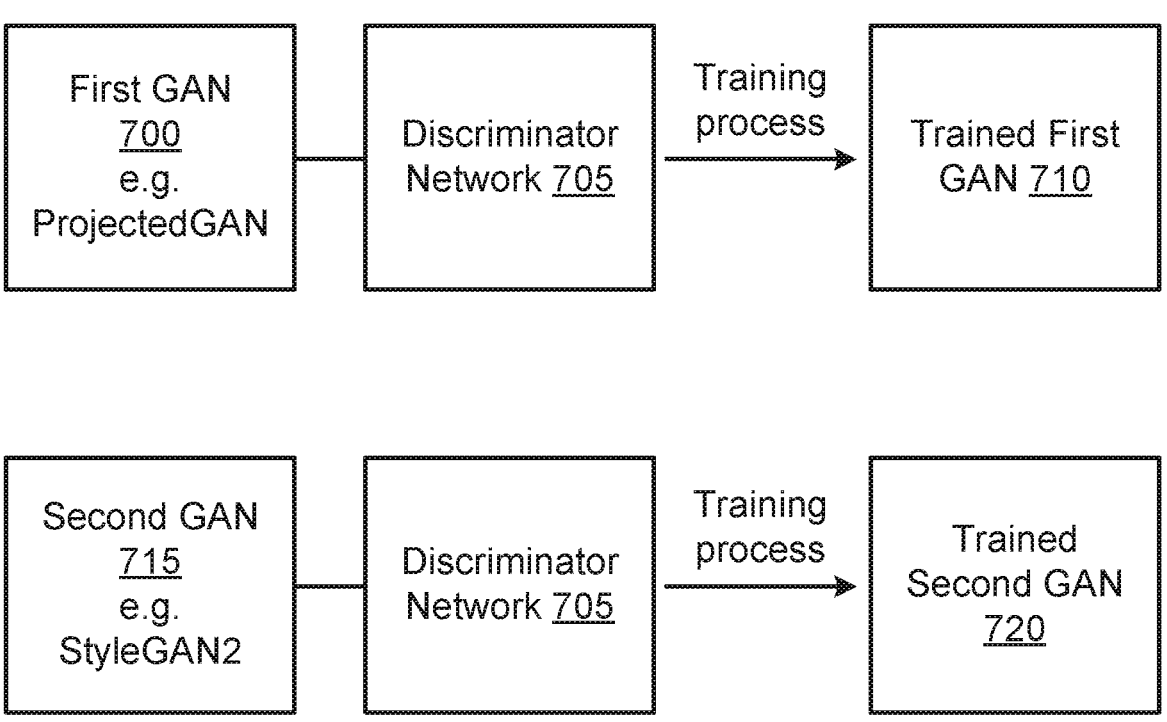
FIG. 7 shows an example of a pipeline for using a partially pretrained discriminator network with other GANs according to aspects of the present disclosure.

FIG. 7 shows an example of a pipeline for using a partially pretrained discriminator network with other GANs according to aspects of the present disclosure. The example shown includes first GAN 700, discriminator network 705, trained first GAN 710, second GAN 715, and trained second GAN 720. Discriminator network 705 is an example of, or includes aspects of, the corresponding discriminator networks described with reference to FIGS. 2 and 4-5.

In this example, the same discriminator network 705 is applied in two different GANs, first GAN 700 and second GAN 715. The discriminator network 705 may include one or more pretrained encoders ("feature extractors") that are configured to extract representations of input images. The discriminator network 705 may further include one or more classifiers respectively corresponding to the one or more feature extractors, which are configured to predict whether the input image is real, e.g., from a training set, or synthetic, e.g., produced from a generator network. In one example, the first GAN 700 includes a generator network based on a first architecture such as ProjectedGAN, and the second GAN 715 includes a generator network based on a different architecture such as StyleGAN2 (e.g., similar to the generator network described with reference to FIG. 3).

According to some aspects, the training process involves iteratively updating the parameters of the GAN as well as the discriminator network 705. In some embodiments, parameters of the classifier(s) of the discriminator network 705 are updated while parameters of the feature extractors are held fixed (as described in FIG. 5). The training process can produce differently trained GANs, such as trained first GAN 710 and trained second GAN 720, using the same discriminator network (705) in a plug-and-play fashion. As described above with reference to FIGS. 4-5, the discriminator network does not need to be customized or have hyperparameters individually tuned, and it is robust to changing frameworks, codebases, and architectures. Accordingly, a discriminator network 705 may be applied to various GAN architectures and enable fast training in different domains.

Image Generation

A method for image generation is described. One or more aspects of the method include obtaining an input vector and generating an image based on the input vector using a generative adversarial network (GAN), wherein the GAN is trained by regularizing a gradient with respect to features generated by the GAN.

In some aspects, the image comprises a face image, and the discriminator network of the GAN is trained to classify face images as real or synthetic. In some aspects, the input vector comprises a random vector. In some aspects, the input vector comprises a text prompt.

Figure 8:
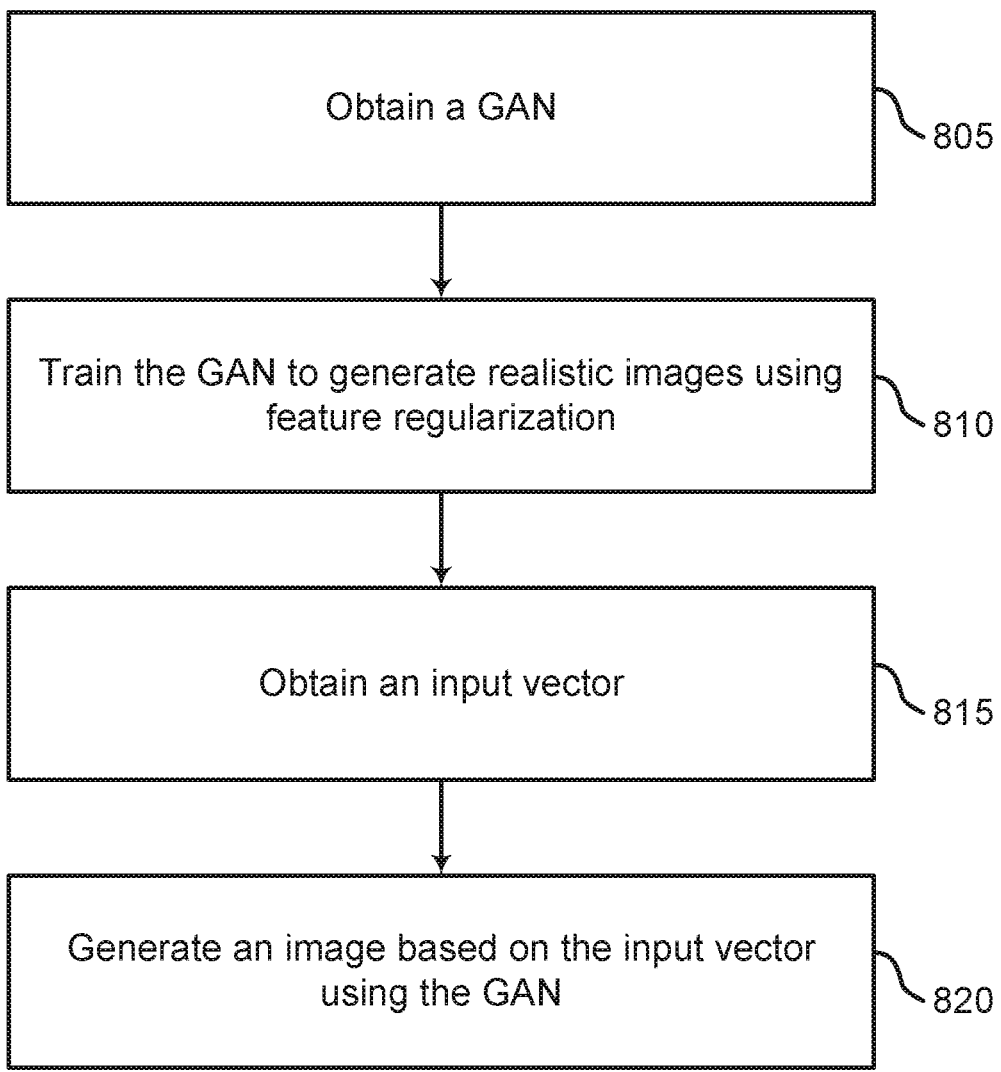
FIG. 8 shows an example of a method for generating an image using a GAN according to aspects of the present disclosure.

FIG. 8 shows an example of a method for generating an image using a GAN according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains a GAN. In some cases, the operations of this step refer to, or may be performed by, an image generation apparatus as described with reference to FIGS. 1 and 2. The GAN may include a generator network comprising a mapping network and a synthesis network, as well as a discriminator network. The generator network can be any type of network configured to generate data and that is capable of adversarial training, such as the style-based network described with reference to FIG. 3. The discriminator network may include one or more pretrained encoders and one or more untrained classifiers, similar to the discriminator networks described with reference to FIGS. 4-5.

At operation 810, the system trains the GAN to generate realistic images using feature regularization. In some cases, the operations of this step refer to, or may be performed by, a generator network as described with reference to FIG. 3. The feature regularization may be performed in accordance with the methods described with reference to FIGS. 4-5.

At operation 815, the system obtains an input vector. The input vector may be sampled from a distribution (e.g., a "noise" vector), or may be conditioned by an input prompt such as a text or image.

At operation 820, the system generates an image based on the input vector using the GAN. The GAN may generate the image according to the process described with reference to FIG. 3.

Figure 9:
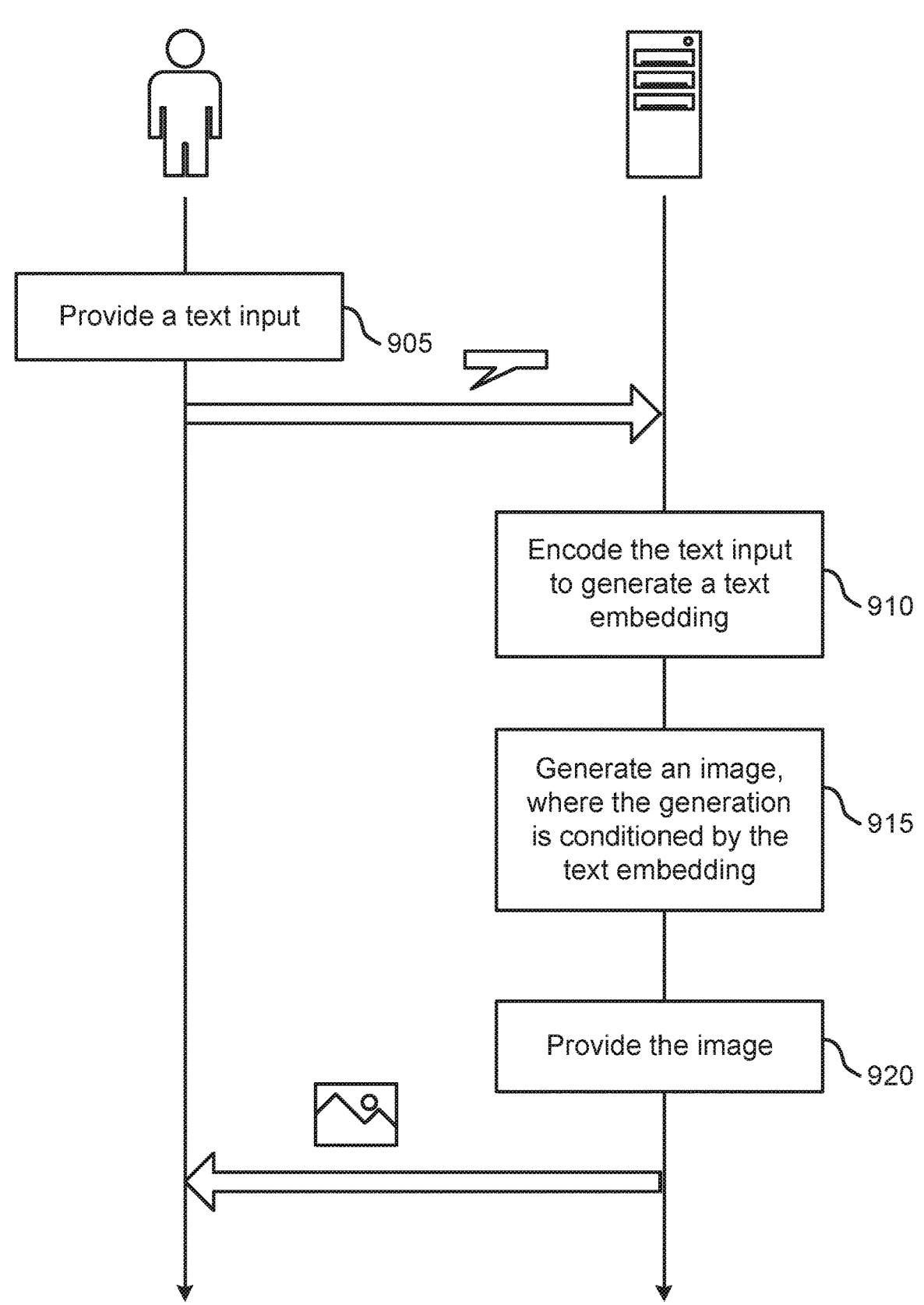
FIG. 9 shows an example of a method for providing an image to a user according to aspects of the present disclosure.

FIG. 9 shows an example of a method for providing an image to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

FIG. 9 describes an example case in which a user utilizes the system for a text-to-image task. At operation 905, a user provides a text input. For example, the user may input the text via a graphical user interface, such as a software interface or a web-app interface or a user device as described in FIG. 1.

At operation 910, the system encodes the text input to generate a text embedding. In some cases, the text input is encoded into an intermediate space such as the space described with reference to FIG. 3.

At operation 915, the system generates an image, where the generation is conditioned by the text embedding. For example, the system may generate the image by decoding a vector using learned transformations as described with reference to FIG. 3.

At operation 920, the system provides the image. The system may provide the generated image through the user interface described above.

FIG. 10 shows an example of a computing device 1000 according to aspects of the present disclosure. The example shown includes computing device 1000, processor(s) 1005, memory subsystem 1010, communication interface 1015, I/O interface 1020, user interface component(s), and channel 1030.

In some embodiments, computing device 1000 is an example of, or includes aspects of, image generation apparatus 100 of FIG. 1. In some embodiments, computing device 1000 includes one or more processors 1005 that can execute instructions stored in memory subsystem 1010 to generate a candidate image using a generator network of a GAN; classify the candidate image as real or generated using a discriminator network of the GAN; and train the GAN to generate realistic images based on the classifying of the candidate image, wherein the training includes regularizing a gradient with respect to features generated by the GAN.

According to some aspects, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1010 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1025 enable a user to interact with computing device 1000. In some cases, user interface component(s) 1025 include an audio device, such as an external speaker system, an external display device such as a display screen, an input device (e.g., a remote control device interfaced with a user interface directly or through the I/O controller), or a combination thereof. In some cases, user interface component(s) 1025 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an input vector; and generating an image based on the input vector using a generative adversarial network (GAN) that includes at least one encoder layer and at least one classifier layer, wherein the at least one classifier layer is trained by computing a regularization loss that includes a gradient with respect to encoded features, wherein the at least one encoder layer generates the encoded features and the at least one classifier layer generates a classification output based on the encoded features, and wherein the gradient has a same dimension as the encoded features.

2. The method of claim 1, wherein:

the gradient is computed based on the classification output independently of the at least one encoder layer.

3. The method of claim 1, wherein:

the input comprises a text prompt.

4. The method of claim 1, wherein:

the image comprises a face image, and a discriminator network of the GAN is trained to classify face images as real or synthetic.

5. An apparatus comprising:

at least one processor;

at least one memory including instructions executable by the processor; and the apparatus further comprising a GAN comprising parameters stored in the at least one memory, wherein the GAN includes at least one encoder layer and at least one classifier layer, wherein the at least one classifier is trained to generate images by computing a regularization loss that incudes a gradient with respect to encoded features generated by the GAN, wherein the at least one encoder layer generates the encoded features and the at least one classifier layer generates a classification output based on the encoded features, and wherein the gradient has a same dimension as the encoded features.

6. The apparatus of claim 5, wherein:

the GAN comprises a generator network configured to generate the images.

7. The apparatus of claim 5, further comprising:

a training component configured to compute a regularization loss, wherein the training is based on the regularization loss.

8. The apparatus of claim 7, wherein:

the regularization loss comprises an R1 regularization loss.

9. The apparatus of claim 5, wherein:

the GAN comprises a discriminator network configured to classify the images, wherein the training is based on the classifying of the images.

10. The apparatus of claim 9, wherein:

the discriminator network of the GAN comprises a pre-trained encoder.

11. The apparatus of claim 9, wherein:

the discriminator network of the GAN comprises a plurality of classifiers.

12. The apparatus of claim 11, wherein:

the discriminator network of the GAN comprises a plurality of encoders corresponding to the plurality of classifiers, respectively.

13. A non-transitory computer readable medium storing code, the code comprising instructions that, when executed by at least one processor, cause the at least one processor to perform operations comprising:

obtaining an input vector; and generating an image based on the input vector using a generative adversarial network (GAN) that includes at least one encoder layer and at least one classifier layer, wherein the at least one classifier layer is trained by computing a regularization loss that includes a gradient with respect to encoded features, wherein the at least one encoder layer generates the encoded features and the at least one classifier layer generates a classification output based on the encoded features, and wherein the gradient has a same dimension as the encoded features.

14. The non-transitory computer readable medium of claim 13, wherein:

the gradient is computed based on the classification output independently of the at least one encoder layer.

15. The non-transitory computer readable medium of claim 13, wherein:

the input comprises a text prompt.

16. The non-transitory computer readable medium of claim 13, wherein:

the image comprises a face image, and a discriminator network of the GAN is trained to classify face images as real or synthetic.

17. The non-transitory computer readable medium of claim 16, wherein:

the discriminator network of the GAN comprises a pre-trained encoder.

18. The non-transitory computer readable medium of claim 13, wherein:

the discriminator network of the GAN comprises a plurality of classifiers.

19. The non-transitory computer readable medium of claim 18, wherein:

the discriminator network of the GAN comprises a plurality of encoders corresponding to the plurality of classifiers, respectively.

20. The non-transitory computer readable medium of claim 13, the code further comprising instructions that, when executed by the at least one processor, cause the at least one processor to perform operations comprising:

computing a regularization loss, wherein the regularization loss comprises an R1 regularization loss.

* * * * *